(12) United States Patent
Mildner et al.

(10) Patent No.: US 9,718,332 B2
(45) Date of Patent: Aug. 1, 2017

(54) FRAME STRUCTURE FOR A VEHICLE DOOR IN PARTICULAR A TAILGATE OF A VEHICLE

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/730,923

(22) Filed: Jun. 4, 2015

(65) Prior Publication Data

US 2015/0352934 A1 Dec. 10, 2015

(30) Foreign Application Priority Data

Jun. 4, 2014 (DE) .................... 10 2014 008 250

(51) Int. Cl.
| | |
|---|---|
| *B60J 5/10* | (2006.01) |
| *B21D 53/88* | (2006.01) |
| *B21D 53/74* | (2006.01) |
| *B21D 7/00* | (2006.01) |

(52) U.S. Cl.
CPC .............. *B60J 5/107* (2013.01); *B21D 53/74* (2013.01); *B21D 53/88* (2013.01); *B60J 5/102* (2013.01); *B21D 7/00* (2013.01); *Y10T 29/49623* (2015.01)

(58) Field of Classification Search
CPC ........... B60J 5/107; B60J 5/102; B21D 53/74; B21D 53/88; B21D 7/00; Y10T 29/49623
USPC ..................................................... 296/146.5
See application file for complete search history.

(56) References Cited

U.S. PATENT DOCUMENTS

| | | | |
|---|---|---|---|
| 5,481,831 A | 1/1996 | Heim et al. | |
| 6,015,182 A | 1/2000 | Weissert et al. | |
| 6,022,070 A | 2/2000 | Ashina et al. | |
| 6,045,182 A | 4/2000 | Chevallier et al. | |
| 6,053,562 A * | 4/2000 | Bednarski | B60J 5/107 296/146.1 |
| 7,363,750 B2 * | 4/2008 | Seksaria | B60J 5/0416 49/349 |
| 7,503,619 B2 | 3/2009 | Werner | |
| 2006/0022486 A1 | 2/2006 | Kalmbach et al. | |

FOREIGN PATENT DOCUMENTS

| | | |
|---|---|---|
| DE | 19713317 A1 | 10/1998 |
| DE | 102004032750 A1 | 2/2006 |
| DE | 102007062340 A1 | 6/2009 |

OTHER PUBLICATIONS

Great Britain Patent Office, Great Britain Search Report for Great Britain Application No. 1509191.1, dated Nov. 25, 2015.
German Patent Office, German Search Report for German Application No. 102014008250.4, dated Jan. 30, 2015.

* cited by examiner

*Primary Examiner* — D Glenn Dayoan
*Assistant Examiner* — Dana D Ivey
(74) *Attorney, Agent, or Firm* — Lorenz & Kopf LLP

(57) ABSTRACT

A frame structure for a vehicle door and a method of manufacture thereof is disclosed. In particular, a tailgate includes at least two tubular parts which are flexurally deformed in the direction of their longitudinal extension and connected to each other to form a ring structure. The ring structure is incorporated into a structural unit with the frame structure in a tailgate of a motor vehicle.

15 Claims, 11 Drawing Sheets

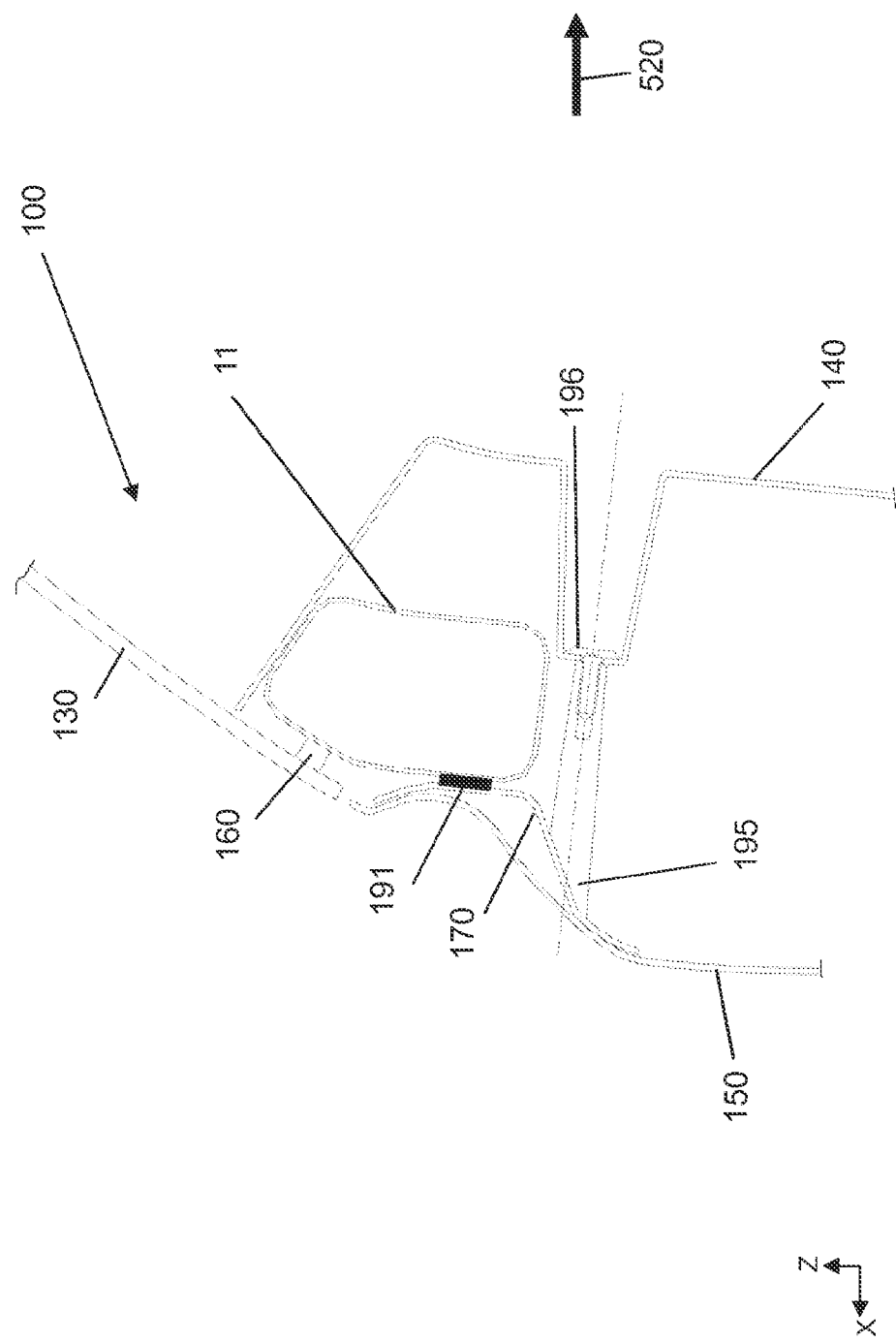

FRAME STRUCTURE FOR A VEHICLE DOOR IN PARTICULAR A TAILGATE OF A VEHICLE

CROSS REFERENCE TO RELATED APPLICATION

This application claims priority to German Patent Application No. 102014008250.4 filed Jun. 4, 2014, which is incorporated herein by reference in its entirety.

TECHNICAL FIELD

The present disclosure pertains to a frame structure for a vehicle door, in particular to a tailgate of a vehicle. The invention furthermore relates to a vehicle door, in particular to a tailgate of a vehicle, having such a frame structure.

BACKGROUND

Future legal requirements regarding $CO_2$ emission of new motor vehicles call for among other things a drastic weight reduction with simultaneously rising requirements in terms of the structural behavior of the vehicle body with respect to durability, interior noise and travelling comfort. The aspect of weight reduction is additionally of relevant importance in the case of battery-operated vehicles in order to increase the range of the vehicles. Despite these increased requirements endeavors are made to keep production costs of the vehicles at a constant level or even reduce these.

SUMMARY

An embodiment for producing a vehicle door relatively cost-effectively, wherein at the same time the high requirements in terms of the structure behavior of the vehicle door are taken into account. According to a further aspect, at least one possibility of being able to produce a vehicle door that is relatively light in weight is to be stated.

According to an embodiment, a frame structure for a vehicle door, in particular a tailgate of a vehicle, comprises at least two formed parts that are tubular and bending-formed in particular in the direction of their longitudinal extension. The formed parts are connected to one another subject to forming a ring structure. In particular, the formed parts are connected to one another subject to forming a closed ring structure.

Because of its tubular funned parts and its ring structure, such a frame structure has a high stability. Because of the ring structure, the frame structure is additionally relatively torsionally stiff. At the same time, the frame structure can be produced relatively cost-effectively since it merely has to undergo technically simple bending forming in order to achieve the form for forming the ring structure. High tolerance requirements can also be satisfied through the bending forming.

The tubular formed part is to mean in particular an elongated body the length of which is substantially greater than its diameter. At least one of the formed parts or at least both formed parts are formed for example C-shaped or U-shaped. Because of this, the formed parts can be connected in a simple manner as far as production is concerned into a ring structure, in particular closed ring structure, by for example connecting the formed parts to one another at their respective ends.

In their form, the formed parts can be designed in such a manner that the formed parts connected to one another form an axis at their connecting points with respect to which the formed parts are substantially located mirror-symmetrically to one another. Because of this it is achieved that in the event of a crash there is good distribution of the impact forces acting on the frame structure, so that local early component overloading is counteracted.

The measure that for example the connecting points are substantially located in a middle region of the ring structure also aims in this direction.

According to a configuration, it is provided that the formed parts are connected to one another subject to forming at least one plug connection. Because of this, the ring structure can be realized in a simple manner by plugging the one of the formed parts with at least one portion into a portion of the other of the formed parts. Because of this, relatively accurate positioning of the formed parts relative to one another is achieved in a technically simple and durable manner.

The at least one plug connection is created for example in that at least one end portion of at least one of the shaped parts is tapered and plugged into the end of the other formed parts. The other formed part can remain unchanged in its cross section in its portion serving as receptacle. In particular, the portions of the formed parts plugged into one another have a contour that substantially corresponds to one another.

Complementarily or alternatively to the plug connection it can be provided that the formed parts are connected to one another by welding, soldering and/or gluing. For example, the formed parts can be prepositioned in their position relative to one another through the designing of the plug connection, wherein through the subsequent welding, soldering and/or gluing fastening of the formed parts to one another is achieved, through which pulling-out from the plug connection is also counteracted. Because of this, the frame structure is formed particularly torsionally stiff.

According to a further configuration, it is provided that at least one of the formed parts is an extruded part and/or metal part, in particular light metal part. Because of this, the formed parts can be realized in a technically simple manner and cost-effectively. By the formed parts consisting of light metal or comprising light metal the aspect of preferably installing components that are light in weight in order to achieve a weight reduction of the overall vehicle is additionally taken into account.

According to a further configuration, a cross connector and/or a diagonal connector is provided, which is arranged at least partially within the ring structure subject to connection to at least one of the formed parts. This measure aims at largely stiffening the frame structure, in particular improving the torsional stiffness of the frame structure.

A particularly stable combination is achieved when the cross connection and/or the diagonal connector on the one hand are connected to the one of the formed parts and on the other hand to the other of the formed parts. For example, the cross connector or the diagonal connector on the one hand can be connected to the one of the formed parts and on the other hand to the other of the formed parts subject to forming at least one plug connection. Because of this an assembly of the frame structure is possible in a simple manner, in particular when the formed parts themselves are also connected to one another by forming at least one plug connection. Connecting the formed parts to one another is then achieved in a simple manner by plugging into one another.

Additionally or alternatively it can be provided that the cross connector and/or diagonal connector and the formed parts are connected to one another through welding, soldering and/or gluing. Because of this, the components are durably connected to one another in a fixed manner and in particular a particularly torsionally-stiff frame structure created. In the case of a present plug connection, pulling-out of the plug connection is thereby securely avoided.

It is appropriate that the cross connector and/or diagonal connector is an extruded part and/or metal part, in particular light metal part. In this regard, the cross connector or diagonal connector can be realized in a technically simple manner. By embodying as light metal part the cross connector or diagonal connector are additionally designed light in weight.

For example, the cross connector or diagonal connector is formed by an elongated profile part or comprises an elongated profile part. Because of this, the cross connector or diagonal connector can be realized in a technically simple manner. The cross connector or diagonal connector is favorably stiffened when it is tubular formed according to a configuration. It is conceivable that the cross connector or diagonal connector is formed as a bending-formed tubular formed part or profile part.

According to a further configuration, it is provided that at least one of the formed parts is a heat formed part. In addition, the at least two formed parts can each be a heat formed part. A heat formed part is to mean a component which has undergone forming by heat forming. Heat forming is to mean in particular a forming method in which the component to be formed is additionally subjected to a heat effect. Heat forming is in particular an internal pressure forming method, with which a blank, for example a pre-bent blank, is heated in order to improve the flow characteristic of the material. In particular, during heat forming, the part to be formed is heated in an upstream operation and the heated part subsequently formed.

By heat forming, the blank on which the formed part is based, can be brought into the final form of the respective formed part in a technically simple manner, wherein during the course of the forming, development of component stresses is counteracted because of the effect of heat. For example it is possible in a simple manner by means of the heat forming to emboss contours or formed regions out of the blank on which the formed part is based.

Provided that the formed parts are connected to one another by means of a plug connection it can be provided that at least one of the formed parts comprises at least one plug-in attachment and/or a tapered or expanded end portion, which is formed onto the formed part. The plug-in attachment or end portion can for example be embossed out of the formed part by means of heat forming.

The plug in-attachment comprises for example a circumferential wall wherein on its free end the plug-in attachment can be formed open. The plug-in attachment can also be formed closed at its free end. The circumferential wall of the plug-in attachment is then formed for example closed on a face end. These forms of the plug-in attachment can be formed or embossed through heat forming.

According to a further configuration, it is provided that the frame structure comprises at least one, preferentially multiple connecting points for pre-fixing and/or fastening at least one attachment part and/or function part, such as for example at least one hinge part, at least one lock part, at least one paneling part and/or a window. Because of this, a vehicle door can be realized in a simple manner with respect to production since the components of the vehicle door are to be attached as attachment parts to the frame structure. The frame structure thus serves as support structure for the attachment parts.

Provided that the formed parts of the frame structure are heat formed parts, the connecting points can be realized through embossing. The connecting points can also be holes or beads, recesses or the like, which were created for example by means of heat forming.

Provided that a diagonal connector or cross connector is provided, it is appropriate that the diagonal connector or cross connector is a heat formed part.

A method for producing a frame structure for a vehicle door, in particular a tailgate of a vehicle is disclosed. In the method, at least two tubular formed parts are connected to one another subject to forming a ring structure, in particular closed ring structure, wherein the blanks on which the formed parts are based are bending-formed beforehand in such a manner that the ring structure is formed during the joining. Because of this, the frame structure can be realized in a simple production manner. A frame structure produced in this manner can be a frame structure of the type described above.

A further step of the method can consist in that the bending-formed blanks in each case are subjected to heat forming, in particular are brought into a final form or the end form of the formed parts by means of heat forming. Because of this, contours and/or similar formed regions can be formed out of the blank, in particular embossed in order to achieve the desired end form of the formed parts in a simple and flexible manner. For example it is possible, because of this, to form, in particular emboss attachment pieces on a tubular blank which serve as plug-in attachment or plug-in piece for forming a plug connection.

In addition, a vehicle door, in particular tailgate of a vehicle, with a frame structure of the type described above is disclosed.

It is appropriate that on the frame structure at least one attachment part and/or function part is pre-fixed and/or fastened. The attachment part of function part can be at least one hinge part, at least one lock part, at least one paneling part, in particular covering part, and/or a window. Because of this the vehicle door can be realized in a simple production manner since the attachment parts or function parts of the vehicle door for the greatest part or altogether can be connected to the frame structure. Because of this, a particularly stable combination of the vehicle door is achieved, since the frame structure serves for support as attachment parts of the vehicle door.

It is appropriate, furthermore, that the vehicle door is formed as pre-assembled module. This measure also aims at achieving production-related advantages. By forming the vehicle door as a pre-assembled module the vehicle door can be easily assembled on the motor vehicle during the course of the final assembly.

In addition, a motor vehicle, which comprises a vehicle door of the type described above is also disclosed.

Through the invention a vehicle door can be realized which in terms of weight is relatively light and can be produced with relatively low costs. The assembly of the vehicle door is also simplified and the assembly time minimized through the invention.

BRIEF DESCRIPTION OF THE DRAWINGS

The present invention will hereinafter be described in conjunction with the following drawing figures, wherein like numerals denote like elements.

Figure 2:
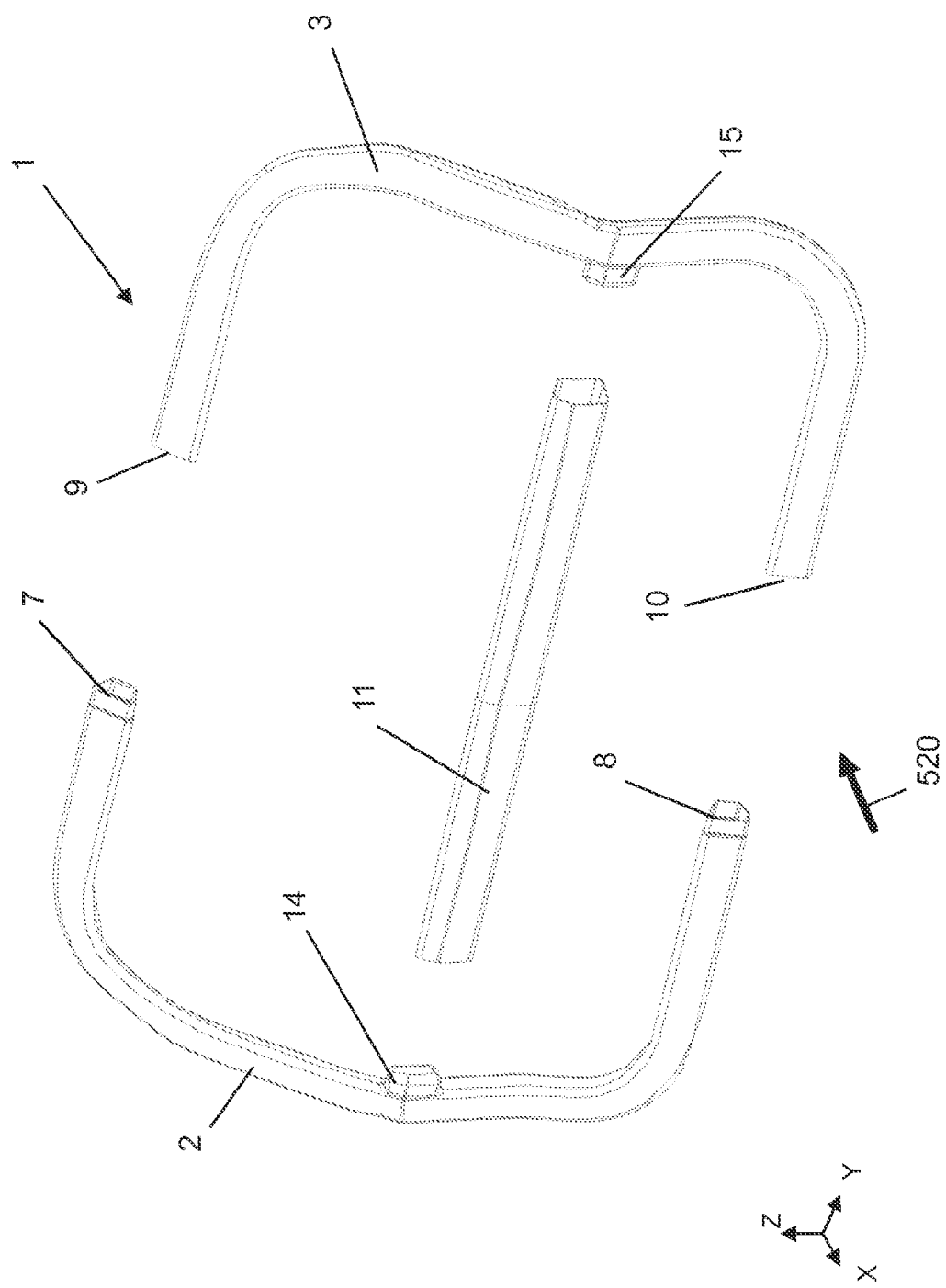
FIG. 2 shows an embodiment of a frame structure for a tailgate of a motor vehicle in exploded representation.
Figure 3:
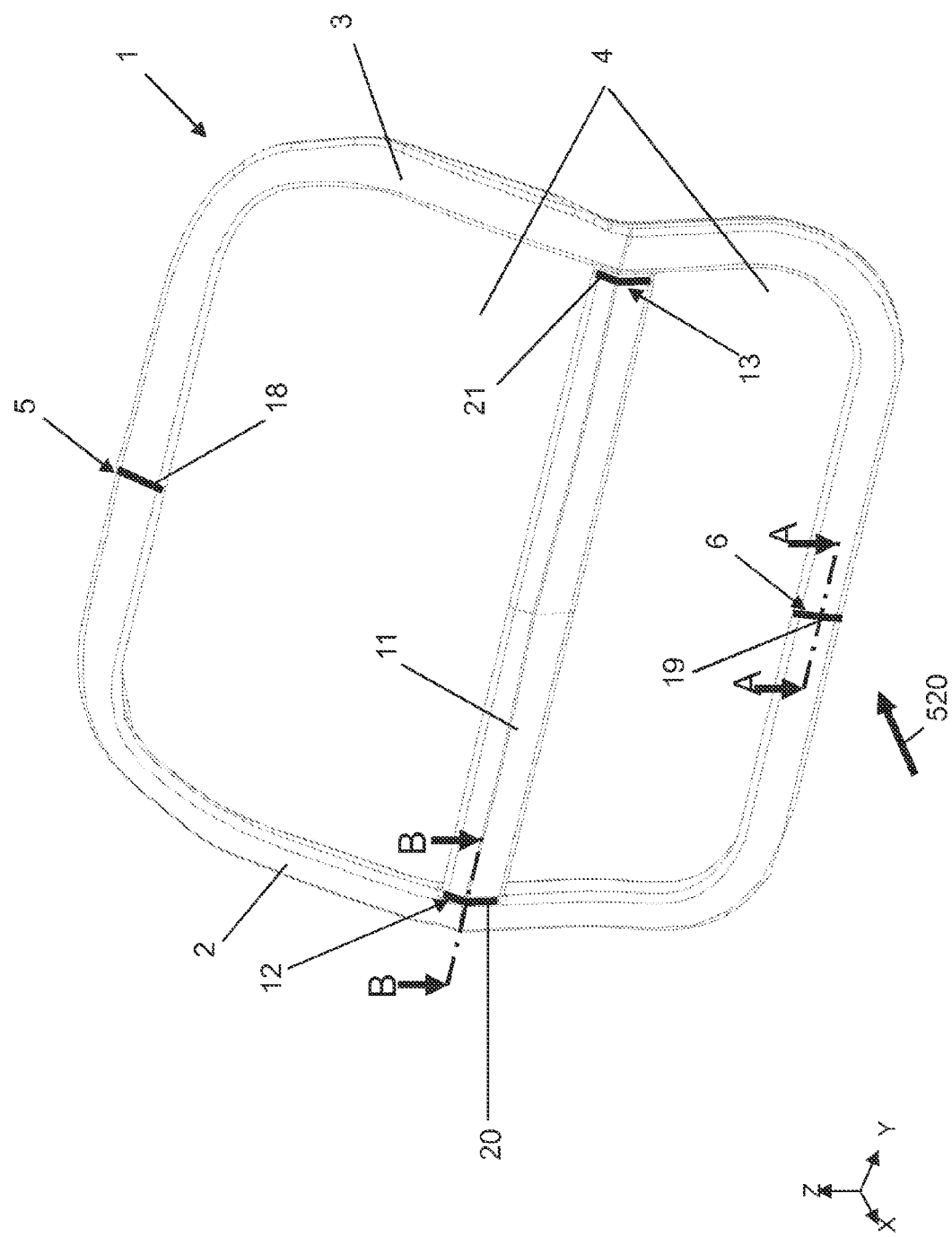
FIG. 3 shows the frame structure according to FIG. 2 in the assembled state in a rear view.
Figure 5:
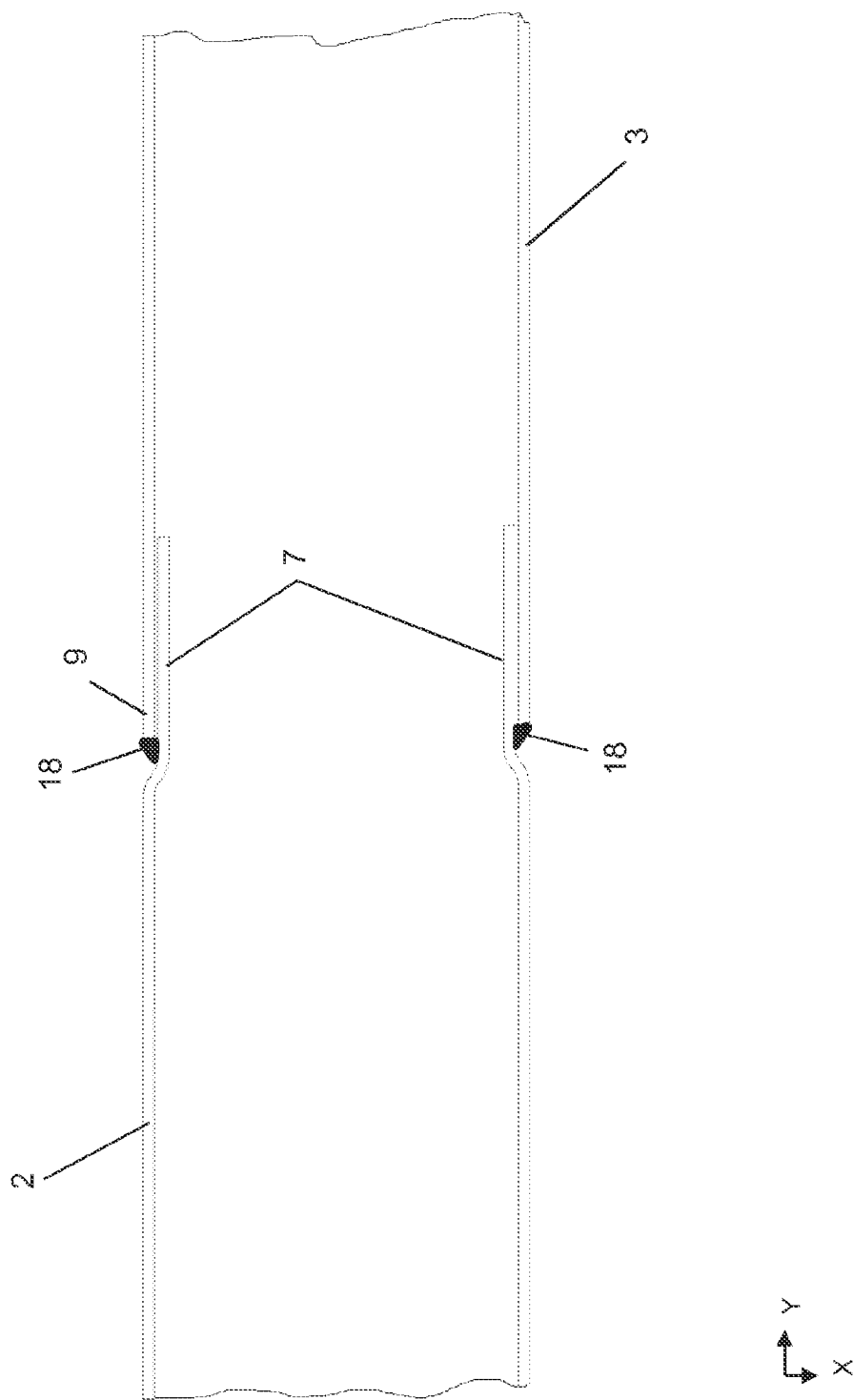
Figure 6:
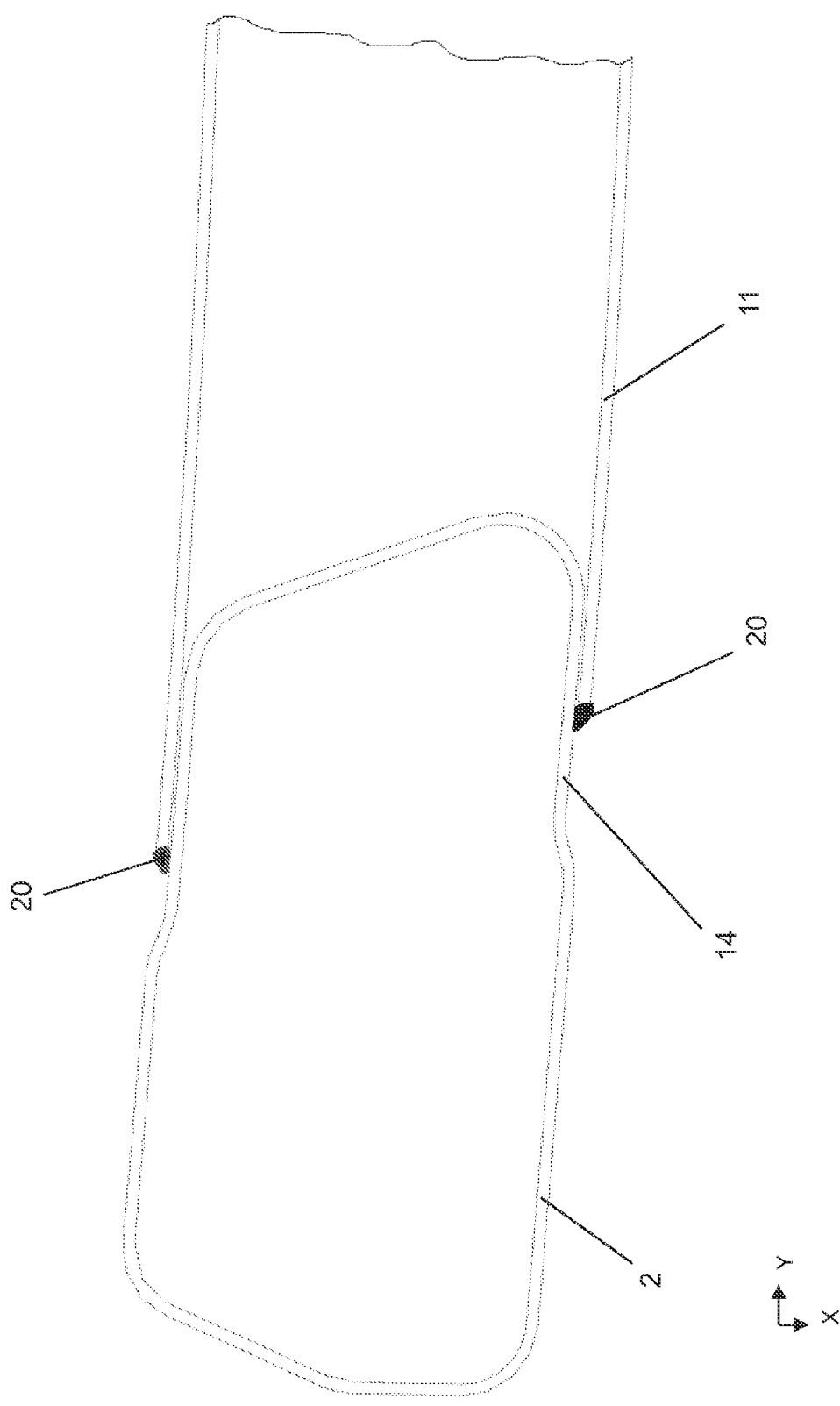
Figure 7:
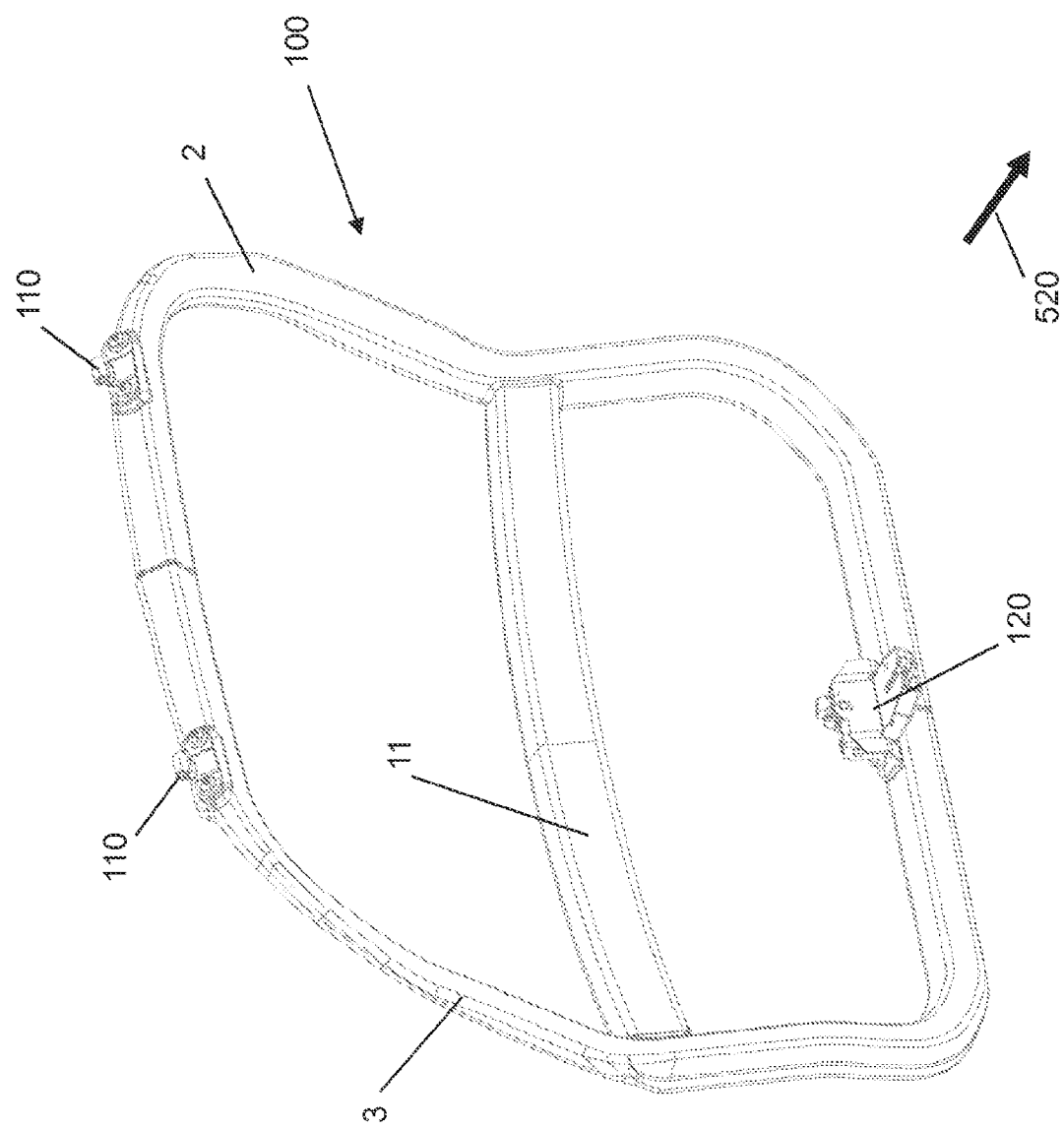
Figure 8:
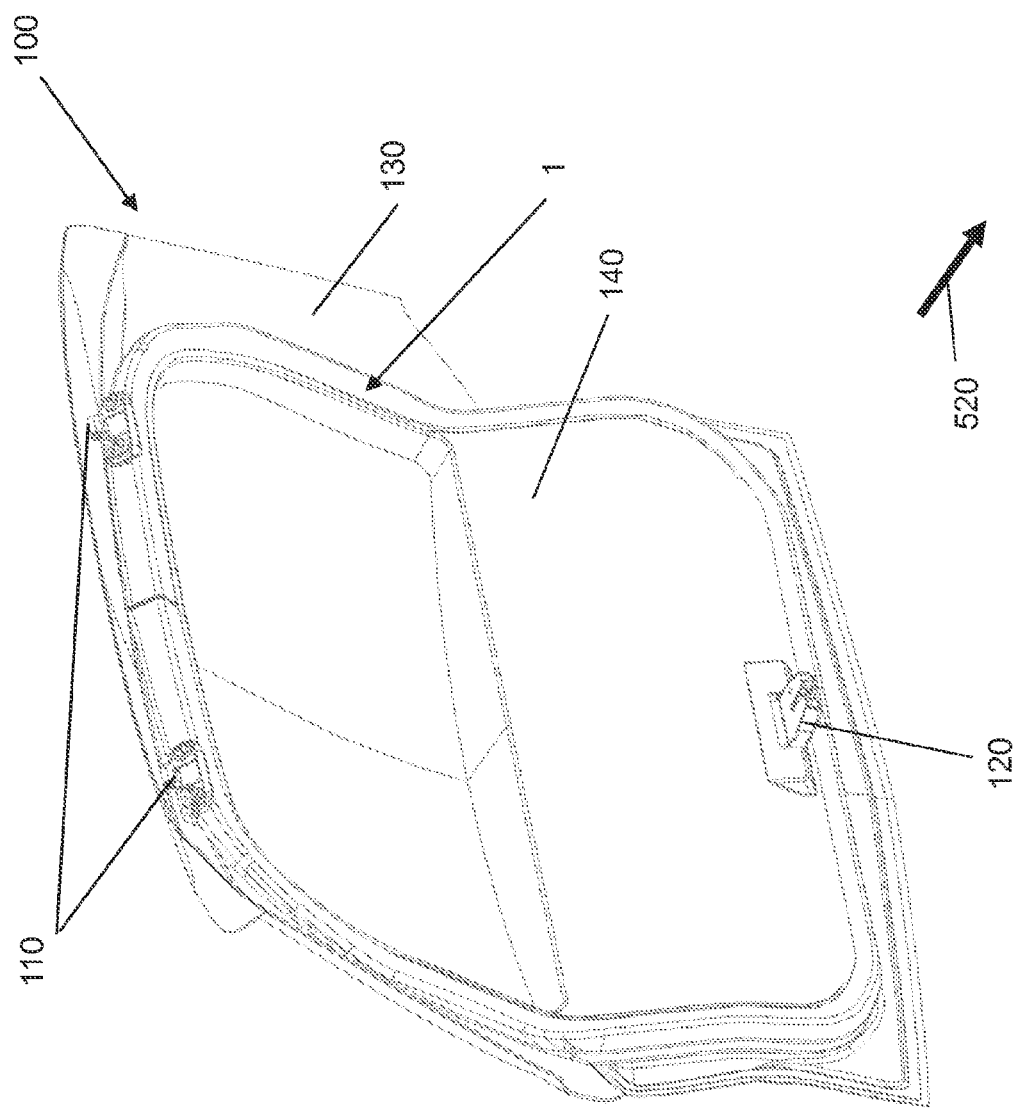
Figure 9:
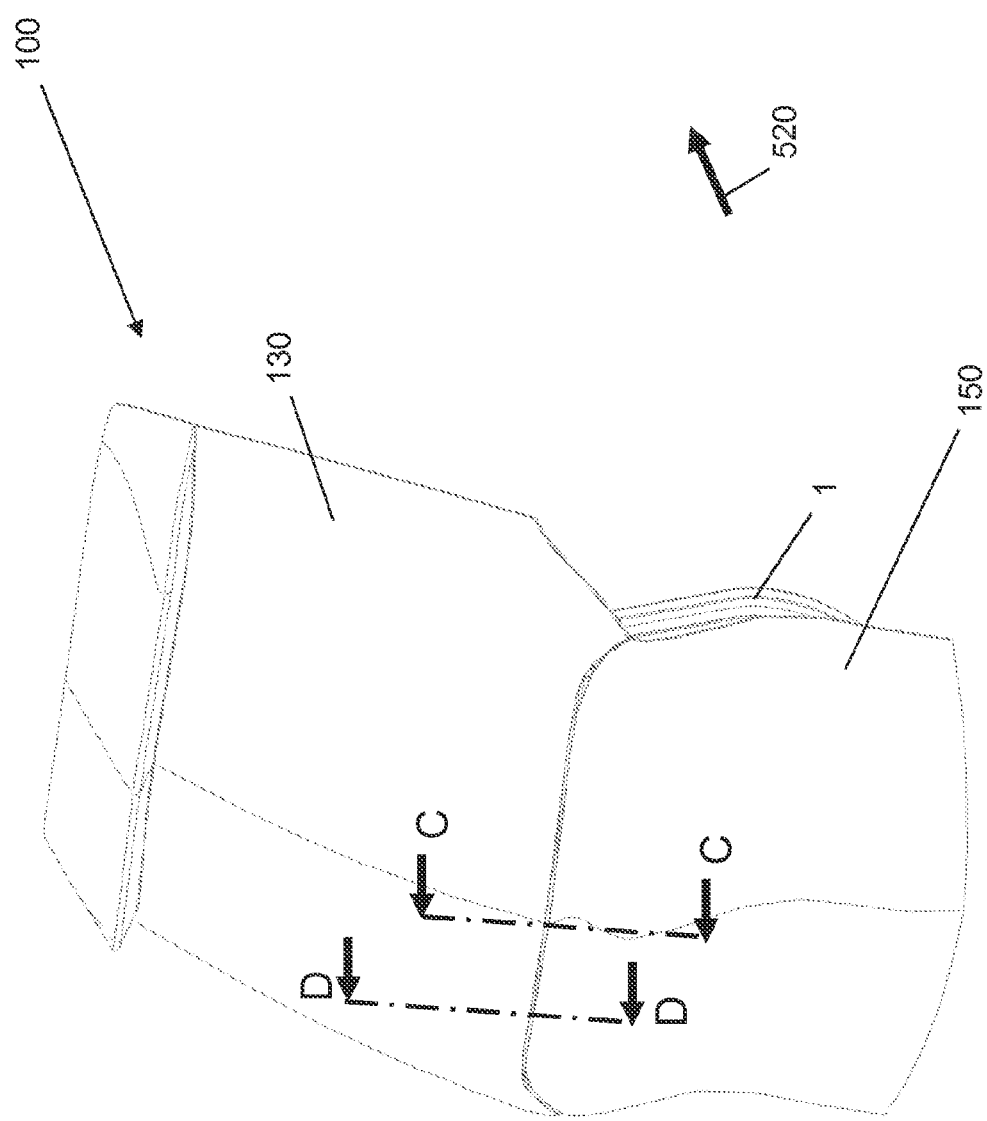
Figure 10:
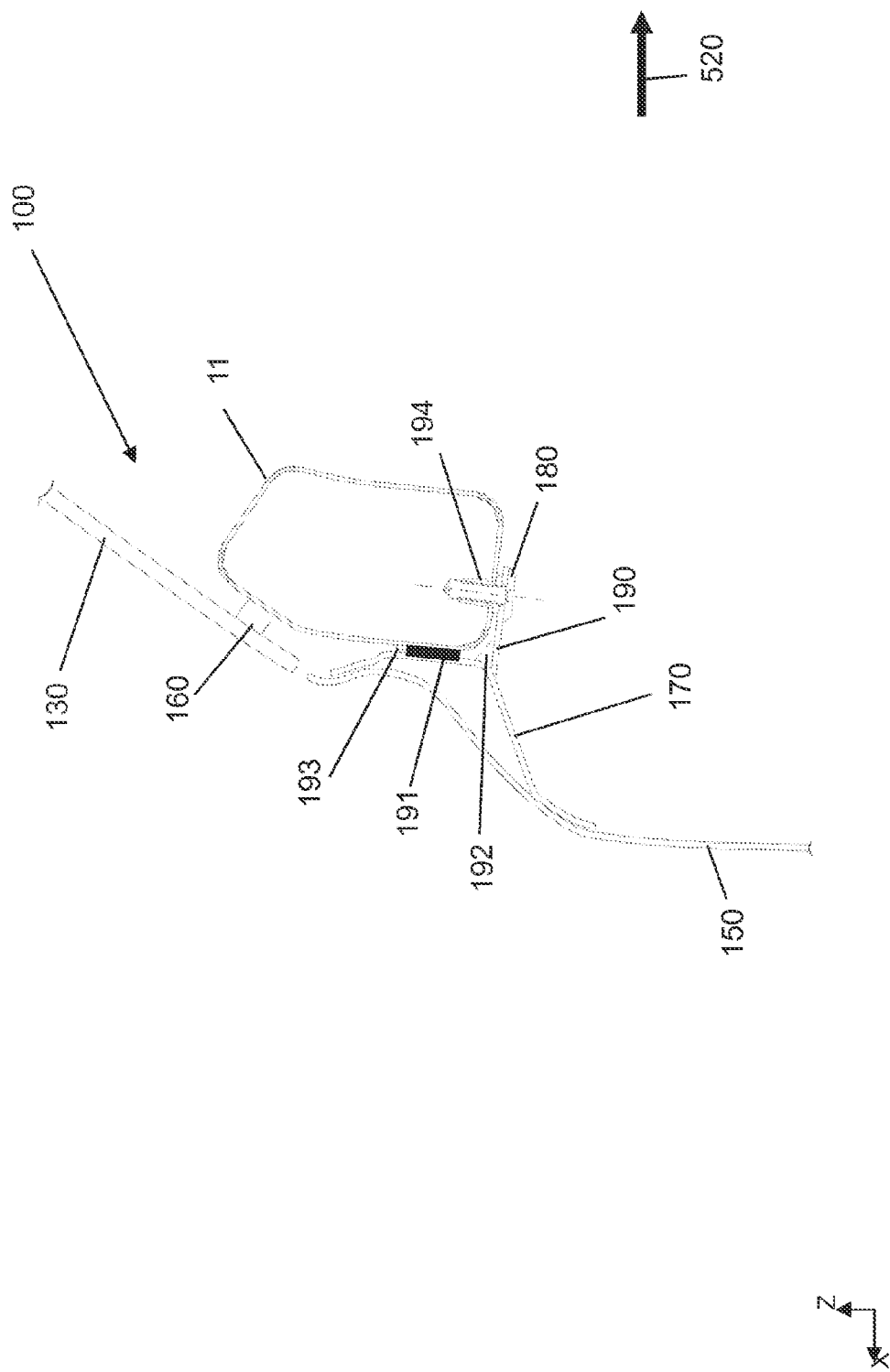

Fig. shows 4 the frame structure according to FIG. 2 in the assembled state in a front view;

FIG. 5 shows a portion of the frame structure according to FIG. 2 in a sectional representation along the section line A-A according to FIG. 3;

FIG. 6 shows a portion of the frame structure according to FIG. 2 in a sectional representation along the section line B-B according to FIG. 3;

FIG. 7 shows the frame structure according to FIG. 2 with function parts fastened thereon in front view;

FIG. 8 shows the embodiment of a tailgate with the frame structure according to FIG. 2 and function parts and covering parts fastened thereon in front view;

FIG. 9 shows the tailgate according to FIG. 8 in rear view;

FIG. 10 shows the tailgate according to FIG. 8 in a sectional representation along the section line C-C according to FIG. 9; and FIG. 11 shows the tailgate according to FIG. 8 in a sectional representation along the section line DD according to FIG. 9.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
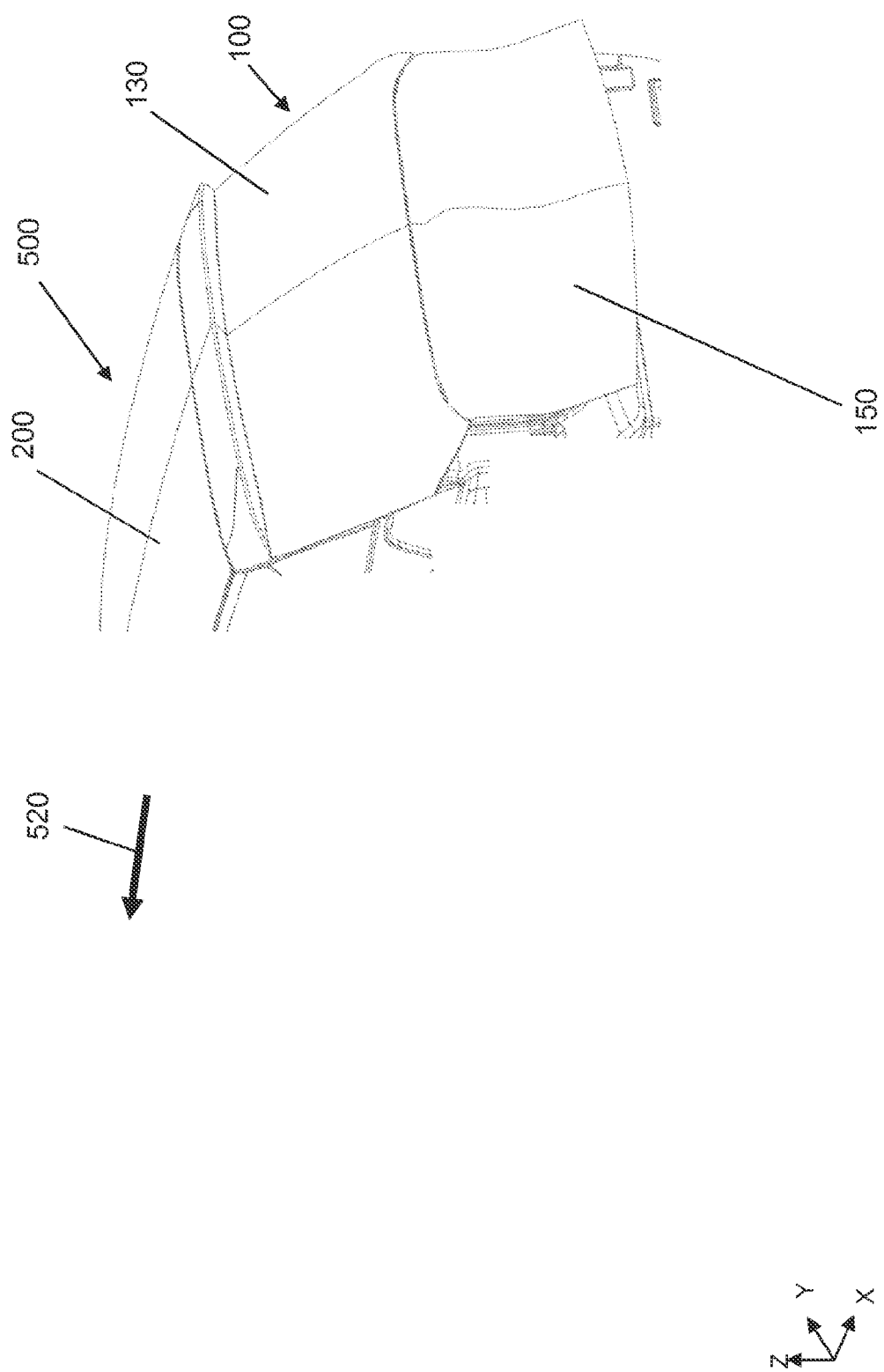
FIG. 1 shows an embodiment of the body of a motor vehicle with a tailgate in perspective view.

FIG. 1 shows—in schematic representation—a possible embodiment of the body of a motor vehicle 500, on the roof 200 of which a tailgate 100 is mounted. The body is shown in an extract of its rear region. The tailgate 100 comprises a window 130 and an outer covering part or an outer paneling part 150, which for example is arranged at least partially below the window 130. To better understand the following explanations, the travelling direction 520 or forward driving direction of the motor vehicle 500 is drawn in.

FIG. 2 shows a possible embodiment of a frame structure 1 for a vehicle door, in particular a tailgate of a vehicle. The tailgate can for example be the tailgate 100 according to FIG. 1. FIG. 2 shows the frame structure 1 in exploded representation. For better understanding, FIGS. 3 and 4 show the frame structure 1 in the assembled state once in rear view (FIG. 3) and once in front view (FIG. 4).

Figure 4:
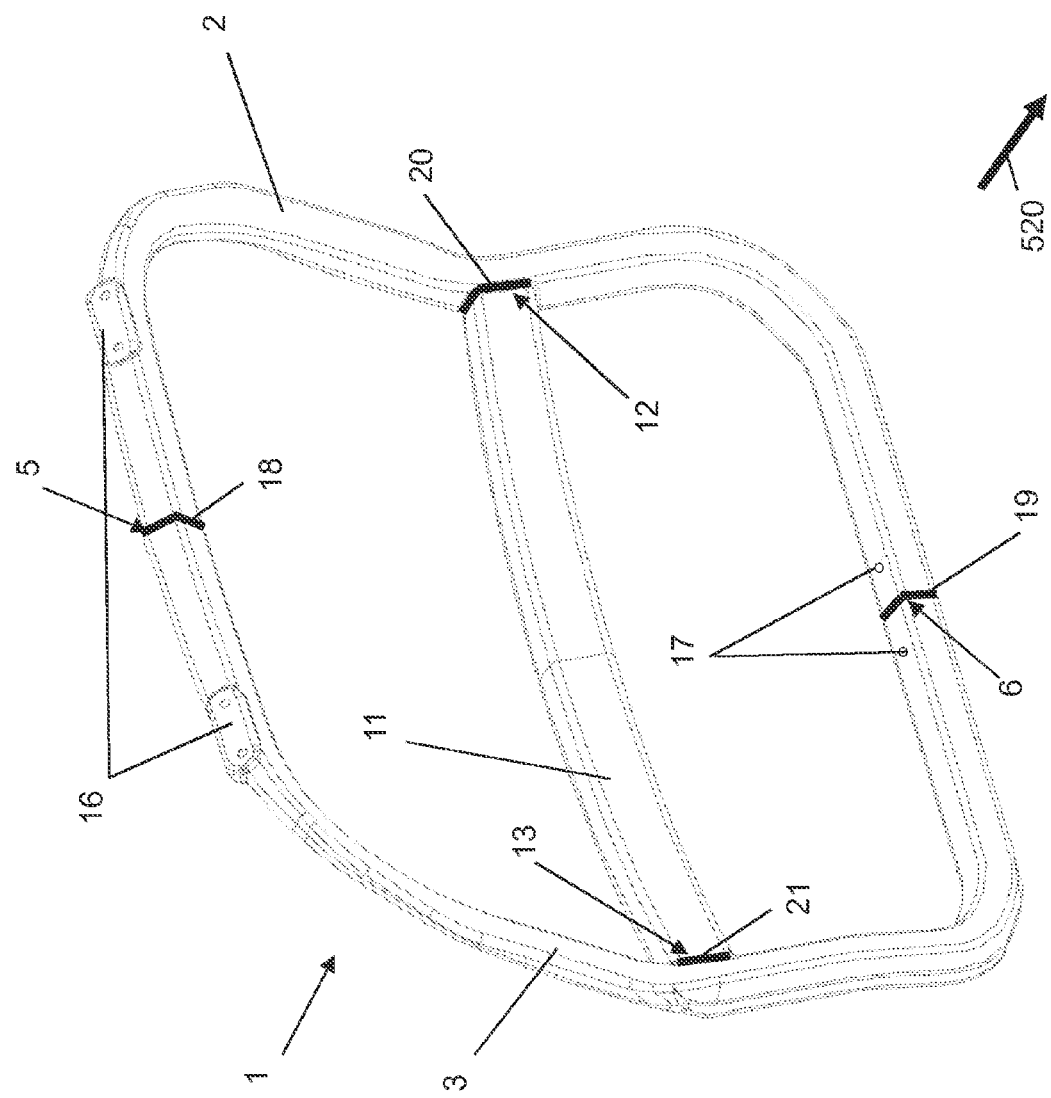

As is evident from viewing FIGS. 2, 3 and 4 together, the frame structure 1 comprises two formed parts 2 and 3 which are connected to one another subject to forming a preferentially closed ring structure 4.

Preferably, the formed parts 2, 3 are tubular formed or formed as tube profile, which are bending-formed in the direction of their longitudinal extension. For example, the formed parts 2 and 3 are formed in such a manner that they are each substantially C-shaped or U-shaped and at their ends the one formed part 2 is connected to the other formed part 3.

Preferably, the connection of the formed parts 2 and 3 to one another is realized in each case by a plug connection 5 and 6 respectively. To this end, the end portions 7 and 8 of the formed part 2 are formed for example tapered and plugged into a respective associated end 9 and 10 respectively of the other formed part 3.

The formed parts 2 and 3 are preferably connected to one another in the manner that the connecting points come to lie substantially in the middle of a tailgate, in particular of the tailgate 100 according to FIG. 1, wherein the center of the tailgate substantially corresponds to the center of the vehicle in vehicle transverse direction.

Preferably, the formed parts 2 and 3 are additionally connected to one another by means of welding, soldering and/or gluing. This joined connection is indicated in the FIGS. 3 and 4 on the example of a welded connection 18 and 19 respectively, which is preferentially arranged in the overlap region of the formed parts 2 and 3, which is created by establishing the plug connections 5 and 6.

Preferably, the frame structure 1 additionally comprises across connector 11, which can the example be formed by a tubular profile part. Preferably, the cross connector 11 is arranged within the ring structure 4 and on the one hand is connected to the formed part 2 and on the other hand to the formed part 3. For example, the connection of the cross connector 11 to the formed part 2 and likewise to the formed part 3 can be realized by means of a plug connection 12 and 13 respectively.

Preferably, the cross connector 11 is aligned with an extension which substantially runs in vehicle transverse direction, when for example the frame structure 1 is employed in a tailgate, in particular the tailgate 100 according to FIG. 1. Preferably, the cross connector 11 is additionally connected to the formed parts 2 and 3 through welding, soldering and/or gluing. This joining connection is indicated in the FIGS. 3 and 4 on the example of a welded connection 20 and 21 respectively, which is preferentially arranged in the overlap region of the formed parts 2 and 3 with the cross connector 11, which is created through the establishment of the plug connections 12 and 13.

Preferably, the formed parts 2 and 3 and if appropriate the cross connector 11 are formed of an extruded metal profile as blank, in particular an extruded light metal profile as blank. Preferably, at least the formed parts 2 and 3 and if appropriate also the cross connector 11 are brought into a final form by means of heat forming. For example, the tapered end sections 7 and 8 of the formed part 2 can be created by embossing by means of heat forming, A plug-in attachment 14 and 15 respectively can also be provided on the formed parts 2 and 3 respectively for plugging into the tube cross section of the cross connector 11 by means of heat forming, in particular embossing.

Preferably, the frame structure 1 additionally comprises multiple connecting points 16 and 17 for fastening function parts and/or attachment parts, such as for example a hinge part, a lock part, one or multiple paneling parts and/or a window. The connecting points 16 and 17 for this purpose can be created by means of heat forming, for example in that they are formed by embossing. The connecting points 16 and 17 can be recesses, apertures, holes, beads and/or similar forms.

FIG. 5 shows in a sectional representation the plug connection 6. There, the end portion 7 is formed tapered relative to the previous outer circumference of the tubular formed part 2, wherein for example the tubular end of the end portion 7 is open. The taper can be created by means of embossing according to the heat forming method. The end 10 of the formed part 3 is additionally connected via a portion of the end portion 7, by means of welding, soldering and/or gluing, as is evident on the example of the weld seam 19.

In a sectional representation, FIG. 6 shows the formed part 2 in the region of its plug-in attachment 14, which can for example be created by means of heat forming through embossing. The plug-in attachment 14 can be formed closed at its free end protruding into the cross connector 11. From FIG. 6 it is evident, furthermore, that the cross connector 11 in the plug-in attachment 14 can be additionally connected in the overlap region by means of welding, soldering and/or gluing, which is exemplarily shown by the weld seam 20.

FIG. 7 shows the frame structure 1 according to the FIGS. 2 to 4, wherein there, on the frame structure ion the connecting points 16 and 17, hinge parts 110 and a lock part 120 are already fastened.

FIG. 8 shows a possible embodiment of a tailgate with a frame structure 1 and the function parts arranged thereon, such as the hinge elements 110 and the lock element 120 according to FIG. 7. The tailgate can be the tailgate 100 according to FIG. 1.

In addition, a covering or paneling 140 facing the interior is attached to the frame structure 1 on the tailgate 100. The tailgate 100, above the cross connector 11, also comprises a window 130.

FIG. 9 shows the tailgate 100 in an outside view. There, in addition to the rear window 130, an outer paneling part 150 or an outer covering is additionally visible, which is likewise connected to the frame structure 1.

In a sectional representation, FIG. 10 shows the region of the cross connector 11 of the frame structure 1 and the function parts or attachment parts of the tailgate 100 connected thereon. The window 130 can be connected to the cross connector 11 and additionally to the formed parts 2 and 3 by means of an adhesive 160. The outer paneling part 150 can be connected to a reinforcing part 170, for example by means of welding, soldering and/or gluing, wherein the reinforcing part 170 in turn can be preferably connected to the cross connector 11 and/or the formed parts 2 and 3.

The connection can have been made by means of at least one fastening screw 180, which for example in a corresponding fastening dowel 194, is connected to the cross connector 11, in particular on a side of the cross connector 11 located downwards. The connection in this case can take place via a fastening strap 190, which is formed, welded, soldered and/or glued onto the reinforcing part 70. To reinforce the connecting region between the fastening strap 190 and the reinforcing part 170, at least one reinforcing rib 190 can be provided in the connecting region, which on the one hand acts on the reinforcing part 170 and on the other hand on the fastening strap 190.

Furthermore, between the reinforcing part 170 and the cross connector 11, for example on a side of the cross connector 11 facing outward, a seal 191, in particular a gasket can be provided. For positioning the reinforcing part 170 with the paneling part 150 attached thereon, at least one positioning rib 193 can be provided on the reinforcing part 170 or on the cross connector 11.

FIG. 11 shows the region of the connection of the function parts or attachment parts on the frame structure 1 or the cross connector 11 of the frame structure 1 in the region of the section line D-D according to FIG. 9. The connection of the inner paneling part 140 to the tailgate 100 is evident from this. The inner paneling part 140 for this purpose can be connected to the outer paneling part 150, in particular the reinforcing part 170 of the outer paneling part 150 by means of a screw connection, in particular a fastening screw 196, and a fastening dome 195. The fastening dome 150 to this end can be injection-molded onto the outer paneling part 150 and/or the reinforcing part 170.

The rear window 130, which can consist of glass or a transparent acrylic plastic or comprise such a material, can be fastened to the frame structure 1 by means of a glued connection. Following this, the outer paneling part 150, which for example consists of painted plastic or comprises painted plastic, is mounted to the frame structure 1 by means of screw and/or engagement connection on the frame structure 1. The inner covering or the inner paneling part 140 is then fastened to the fastening dome 150. In this way, the tailgate 100 can be produced as tailgate module in a simple manner, which in the final assembly of the motor vehicle production line is fastened to the hinge elements mounted on the body.

Although the invention was described with the help of at least one exemplary embodiment it is to be understood that there exists a multitude of versions. It should also be noted that the exemplary embodiment of the exemplary embodiments are only examples and not intended to restrict the scope of protection, the applicability or realization or the construction in any way. The above description provides the person skilled in the art with a suitable guideline for implementing or carrying out at least one embodiment; it is to be understood that various changes in the function and arrangement of elements or components, which are described above in at least one exemplary embodiment, can be made without deviating from the scope of protection of the following claims and their legal equivalents.

The invention claimed is:

1. A frame structure for a vehicle door comprising:
at least two tubular formed parts, each tubular formed part bends in the longitudinal direction, the two tubular formed parts are connected to one another and form a ring structure, each tubular formed part includes a plug-in attachment that extends outwardly from the tubular formed part at the bend, each of the plug-in attachments having a free end; and
a cross connector at least partially arranged within the ring structure and connected to each of the plug-in attachments of the tubular formed parts at the bend, wherein the free end of each of the plug-in attachments is received into a respective end of the cross connector to connect the cross connector to the tubular formed parts at the bend.

2. The frame structure according to claim 1, further comprising at least one plug connection between the tubular formed parts.

3. The frame structure according to claim 2, wherein an end portion of at least one of the tubular formed parts is tapered and plugged into an end of the other tubular formed part.

4. The frame structure according to claim 1, wherein the tubular formed parts are connected to one another through one of welding, soldering or gluing.

5. The frame structure according to claim 1, wherein at least one of the tubular formed parts is an extruded metal part.

6. The frame structure according to claim 1, wherein at least one of the tubular formed parts is a heat formed part.

7. The frame structure according to claim 1, wherein at least one of the tubular formed parts comprises a second plug-in attachment formed onto the at least one of the tubular formed parts.

8. The frame structure according to claim 7 where the plug-in attachment is embossed out of the formed part by means of heat forming.

9. The frame structure according to claim 1, wherein the frame structure comprises a connecting point for fastening at least one attachment part on the frame structure, wherein the at least one attachment part is selected from the group consisting of a hinge part, a lock part, a paneling part, a window or a combination thereof.

10. A tailgate of a vehicle with a frame structure according to claim 1.

11. The tailgate according to claim 10, further comprising at least one attachment part fastened on the frame structure, wherein the at least one attachment part is selected from the group consisting of a hinge part, a lock part, a paneling part, a window or a combination thereof.

12. The tailgate according to claim 10, wherein the tailgate is formed as a pre-assembled module.

13. A motor vehicle with a frame structure according to claim 1.

14. The frame structure according to claim 1, further comprising a reinforcing part connected to an outer paneling part, and the reinforcing part is connected to the cross connector by a fastening strap.

15. A method for producing a frame structure for a tailgate of a vehicle comprising:
  bend-forming at least two tubular elements in a blank to form two bent-formed tubular parts, each tubular formed part bends in the longitudinal direction and the at least two tubular parts include a plug-in attachment that extends outwardly from the respective tubular formed part at the bend, each of the plug-in attachments having a free end;
  joining the two bent-formed tubular parts to one another to form a ring structure;
  connecting a cross connector to each of the plug-in attachments of the tubular formed parts at the bend such that the cross connector is arranged within the ring structure with the free end of each of the plug-in attachments received into a respective end of the cross connector to connect the cross connector to the tubular formed parts at the bend;
  connecting a reinforcing part to an outer paneling part; and
  connecting the reinforcing part to the cross connector by a fastening strap,
  wherein the blank are used to form the two bent-formed parts are bending-formed beforehand in such a manner that the ring structure is formed upon joining.

* * * * *